Nov. 18, 1924.  1,516,142

B. H. BLOOD

GAUGE

Filed Jan. 26, 1921

Inventor
B. H. Blood
By Joseph K. Schofield
Attorney

Patented Nov. 18, 1924.

1,516,142

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

GAUGE.

Application filed January 26, 1921. Serial No. 440,088.

*To all whom it may concern:*

Be it known that I, BRYANT H. BLOOD, a citizen of the United States, residing at Hartford, in the county of Hartford and State of Connecticut, have invented certain new and useful Improvements in Gauges, of which the following is a specification.

This invention relates to gauges and particularly to plug gauges preferably of the "go" and "not go" type adapted to measure circular openings to determine accurately when such openings are of a predetermined dimension. It is the primary object of the invention to provide an improved gauge of this general type.

It is an object of the invention to provide simple and improved means for rigidly securing the gaging heads to the gauge handle and for preventing relative rotation and looseness between the gaging heads and handle.

Another object of the invention is to provide a gauge of the type defined comprising few and simple parts adapted to be easily manufactured and assembled with a minimum of time and expense and providing, when assembled, a gauge of a very rigid and substantial character.

A further object of the invention is to provide a gauge having a reversible gaging head and improved means whereby the head may be quickly and easily detached from and attached to the gauge in either of two reversible positions.

With the above and other objects in view as will appear as the description proceeds, the invention will now be described by reference to the drawing wherein.

In gauges of the type defined, ease and simplicity of manufacture and rigidity of parts are of primary importance. These and other improvements are outstanding features of the present invention. The gauge herein comprises a minimum number of parts, as a handle, gaging heads and means for securing the heads to the handle, and such parts, as illustrated, are fashioned in the simplest manner possible to produce an instrument capable of withstanding the usual wear and tear and of performing the desired function with accuracy. It will be noted that further improved and simple means comprising interengaging projections and recesses between the gaging heads and the gauge handle are provided for preventing rotation of the heads relative to the handle. The invention as herein illustrated and described shows certain preferred forms thereof, it being understood, however, that modifications within the scope of the appended claims may be made without departing from the spirit of the invention.

Figure 1:
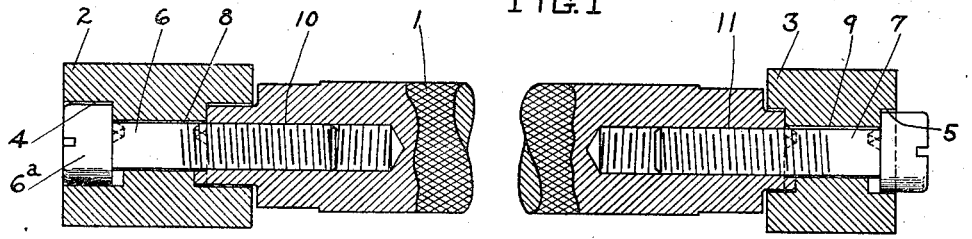
Figure 1 is a broken side view of a double end plug gauge, the ends thereof being shown in section.

Referring more specifically to the drawing, 1 designates the gauge handle, illustrated in Fig. 1 as provided at the ends thereof with a pair of cylindrical gaging heads 2 and 3 of the "go" and "not go" type respectively. Each of these heads is preferably provided with a recess in each end thereof, the recesses 4 in the "go" head being deeper than the recesses 5 in the "not go" head. Each of the two recesses 4 and the two recesses 5 are identical whereby either recess is adapted to fit over the end of the gauge handle, thereby making the heads reversible. The heads are secured to the handle by means of bolts 6 and 7 respectively engaging in openings 8 and 9 in the gaging heads 2 and 3 and threading into the handle ends at 10 and 11.

The gauge heads are prevented from rotation and looseness relative to the handle by means of inter-engaging projections 12 and recesses 13 on the handle and heads respectively. The projections are preferably wedge shaped, as illustrated, and the corresponding recesses may be of a corresponding or other shape as desired. As illustrated in the drawing, I preferably provide three such projections and recesses whereby a tripod support is formed for firmly seating the head against the handle. The bolts 6 and 7 are made to provide a loose fit either within the handle or head whereby the head is held loosely thereby relative to the handle. In the drawing, I have preferred to illustrated a slight clearance between the head and the parts engaged thereby. With such a construction, each bolt is adapted to draw its head into engagement with the handle with the three projections seating firmly with a tripod support in the three recesses. When so secured, the heads are held against any looseness on the handle. It will be noted that the bolt head 6ª is seated flush within the "go" head 2 whereby the gauge may be stood upright on such end.

Figure 2:
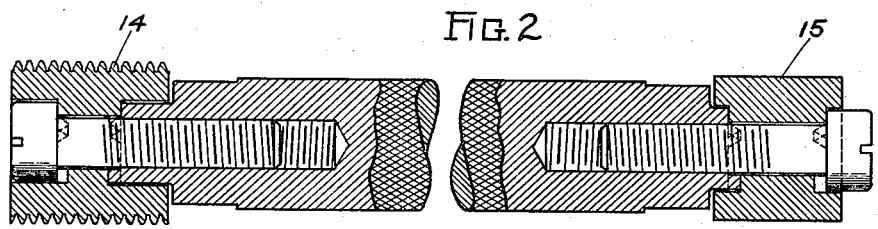
Fig. 2 is a view similar to Fig. 1, the gaging heads however being adapted to measure the root and apex diameters of a threaded opening.
Figure 3:
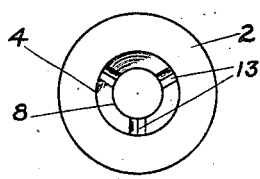
Fig. 3 is an end view of one of the gaging heads shown in Fig. 1.
Figure 4:
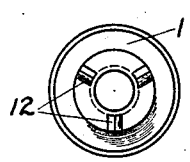
Fig. 4 is an end view of the gauge handle.
Figure 5:
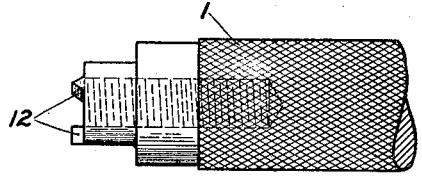
Fig. 5 is a fragmentary side elevation thereof.

The gauge illustrated in Fig. 2 is substantially the same as that shown in Fig. 1, the only difference being that a thread gaging head 14 and a corresponding cylindrical gaging head 15 has been substituted for the heads 2 and 3. The heads 14 and 15 are adapted to gauge the threads of a threaded opening at the root and apices thereof respectively. It should be understood that Figs. 1 and 2 illustrate only two of the several gauge combinations possible with the gauge construction comprising this invention.

Figure 6:
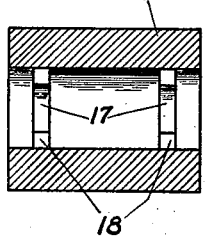
Fig. 6 is a longitudinal sectional view through a modified form of gaging head.
Figure 7:
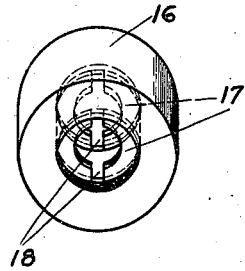
Fig. 7 is a perspective end view thereof.
Figure 8:
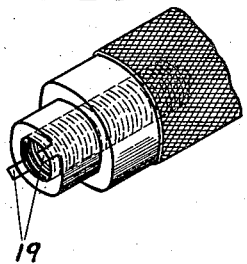
Fig. 8 is a fragmentary perspective view of the gauge handle used therewith.

In Figs. 6, 7 and 8 is illustrated a modified form of the invention wherein a pair of straight sided lugs or projections is provided on the gauge handle for engaging a pair of corresponding recesses in the gaging head. In this form of the invention the gaging head 16 is provided with annular shoulders 17 in the bore adjacent each end thereof. At diametrically opposite points these shoulders are cut out to provide recesses 18 adapted to be engaged by projections 19 on the gauge handle. This construction is otherwise substantially that shown in Fig. 1, the heads being adapted to be mounted on the handle by means of bolts, as the bolts 6 and 7, and being prevented from rotation relative to the handle by means of the interengaging lugs and recesses 18 and 19.

From the above description it will be seen that the gauge comprising the present invention has been reduced to the most extreme simplicity in form and manufacture conducive to the production of a gauge having the necessary features required to perform the desired function. The gauge comprises broadly a handle, gaging heads, and securing means therefor. The gaging heads are reversible and the securing means are adapted for quick and easy operation to remove the gaging heads from and secure the same to the handle. The improved means, comprising the projections 12 and 19, for securing the gaging heads against rotation relative to the handle, is extremely simple and such projections can be easily formed on the handle with a minimum of time and expense. It should be understood, however, that the projections 12 and recesses 13 are of such relative shapes that the projections wedge tightly within the recesses. Modifications of the invention within the scope of the appended claims are considered as within the scope of the invention.

What I claim is:

1. In a gauge, the combination of a handle, a gaging head adapted to be mounted thereon with one end of the head abutting against one end of the handle, three projections on one of the said ends engaging three cooperating recesses in the other end for preventing relative rotation of such members, and means for holding the head securely seated on the handle with the three projections tightly engaged with a tripod effect in the three recesses.

2. In a gauge, the combination of a handle, a gaging head adapted to be mounted thereon with one end of the head abutting against one end of the handle, three wedge-shaped projections on the said end of the handle for engaging cooperating recesses in the end of the head with a tripod effect for preventing relative rotation and looseness of such members, and means for securing the head to the handle with the projections engaged within the recesses.

3. In a gauge, the combination of a handle, a gaging head adapted to be mounted on one end thereof with one end of the head abutting against one end of the handle, a projection on one of the said ends engaging a cooperating recess in the other end for preventing relative rotation of such members, the gaging head and handle having aligned openings and the projection and recess being of such relative shapes as to form a wedging action to prevent looseness of the head on the handle, and screw threaded means extending through one opening and threadedly engaging within the other opening to secure the head to the handle with the projection wedged within the recess.

4. In a gauge, the combination of a handle, a gaging head adapted to be mounted thereon with one end of the head abutting against one end of the handle, the abutting end of the head being countersunk and provided with three relatively spaced recesses in the bottom thereof, three projections on the handle end for engaging within the recesses, and screw threaded means for securing the head to the handle with the projections engaged with a tripod effect within the recesses.

5. In a gauge, the combination of a handle, a gaging head adapted to be mounted thereon with one end of the head abutting against one end of the handle, rotation or looseness of the head on the handle being adapted to be prevented by means comprising a plurality of inter-engaging projections and recesses on the said abutting ends, one of such means being V-shaped whereby to provide a wedging action, and means for holding the head securely seated on the handle with the projections tightly wedged in the recesses.

6. In a gauge, the combination of a handle, a gaging head adapted to be mounted thereon with one end of the head abutting against one end of the handle, rotation or looseness of the head on the handle being adapted to be prevented by means comprising three inter-engaging projections and recesses on the said abutting ends and producing a tripod engagement between the head and handle, one of such means being V-shaped and extending approximately in a radial direction whereby to provide a wedging action, and means for holding the head securely seated on the handle with the projections tightly wedged within the recesses.

7. In a gauge, the combination of a handle, a reversible gaging head adapted to be mounted on the handle with either end thereof abutting against the handle end, inter-engaging projection and recess means between the handle end and either gaging head end for preventing relative rotation of such members, the relative shapes of such means being such that their cooperation forms a wedge lock preventing looseness of the head on the handle, and screw threaded means for securing the head to the handle with the projection and recess means in tight engagement.

8. In a gauge, the combination of a handle, a reversible gaging head adapted to be mounted on the handle with either end thereof abutting against the handle end, a plurality of projections on the said end of the handle for engaging cooperating recesses in either end of the head for preventing relative rotation of such members, the relative shapes of the projections and recesses being such that the projections are wedged into the recesses in a manner preventing looseness of the head on the handle, and means for securing the head to the handle with the projections and recesses in tight engagement.

9. In a gauge, the combination of a handle, a reversible gaging head adapted to be mounted on the handle with either end thereof abutting against the handle end, three wedge-shaped projections on the said end of the handle, the gaging head ends each being provided with three recesses adapted to cooperate with the projections on the handle, and means for securing the head to the handle with either end in engagement with the handle end and the projections firmly seated with a tripod effect in the recesses therein.

10. In a gauge, the combination of a handle, a reversible gaging head adapted to be mounted on the handle with either end thereof abutting against the handle end, the gaging head and handle having aligned openings, three inter-engaging projections and recesses between the end of the handle and the other end of the gaging head for forming a tripod connection to prevent relative rotation and looseness of such members, and a bolt extending through the opening in the head and threadedly engaging within the opening in the handle to secure the same to the handle with the projections and recesses in tight engagement.

11. In a gauge, the combination of a handle, a reversible gaging head adapted to be mounted on the handle with either end thereof abutting against the handle end, the gaging head and handle having aligned openings and the ends of the gaging head being countersunk about the openings therein, inter-engaging projection and recess means between the end of the handle and the bottoms of the countersinks for preventing relative rotation of such members, and a bolt extending through the opening in the head and threadedly engaging within the opening in the handle to secure the same to the handle with the projection and recess means in tight engagement.

12. In a gauge, the combination of a handle, a reversible gaging head adapted to be mounted on the handle with either end thereof abutting against the handle end, the gaging head and handle having aligned openings and the ends of the gaging head being countersunk about the opening therein, a bolt extending through the opening in the head and having its head engaging in the outer countersink of the gaging head and its inner end threadedly engaging within the opening in the handle to secure the gaging head to the handle, and projections on the end of the handle adapted to engage recesses in the bottom of the inner countersink for preventing the relative rotation of such members.

13. As an article of manufacture, a gaging head adapted to be mounted on the end of a gauge handle, the head being provided with a plurality of V-shaped recesses in one end thereof adapted to abut against and cooperate with engaging projections on the handle end for preventing relative rotation or looseness of the head on the handle.

14. As an article of manufacture, a reversible gaging head adapted to be mounted on the end of a gauge handle with either end thereof abutting against the handle end, the head being provided with three recesses in each end thereof adapted to abut against and cooperate with three projections on the handle end to form a tripod engagement therewith for preventing relative rotation or looseness of the head on the handle.

15. As an article of manufacture, a gaging head adapted to be mounted on the end of a gauge handle, the head being provided with three radial V-shaped recesses in one end thereof adapted to abut against and cooperate with three projections on the handle end to form a tripod engagement therewith for preventing relative rotation or looseness of the head on the handle.

In testimony whereof, I hereto affix my signature.

BRYANT H. BLOOD.